April 15, 1952　　　　J. H. MOORE　　　　2,593,169

FLUID PRESSURE MEASURING APPARATUS

Filed Sept. 6, 1945　　　　　　　　　　2 SHEETS—SHEET 1

INVENTOR.
JOHN H. MOORE
BY
ATTORNEY

April 15, 1952    J. H. MOORE    2,593,169
FLUID PRESSURE MEASURING APPARATUS
Filed Sept. 6, 1945    2 SHEETS—SHEET 2

INVENTOR.
JOHN H. MOORE
BY
ATTORNEY

Patented Apr. 15, 1952

2,593,169

UNITED STATES PATENT OFFICE 2,593,169

FLUID PRESSURE MEASURING APPARATUS

John H. Moore, Springfield, Pa., assignor to Baldwin-Lima-Hamilton Corporation, a corporation of Pennsylvania Application September 6, 1945, Serial No. 614,765

10 Claims. (Cl. 73—398)

This invention relates to measuring devices, and has for an object the provision of means for eliminating the effects of accelerating forces, vibration and the like upon such devices.

In the measurement of variables on aircraft, the effect of acceleration must be taken into account. With the present high speed operation of airplanes, these accelerating forces are of substantial magnitude and even with measuring devices relatively light in weight they are adversely affected. Moreover, at the time that the accelerating forces may be the greatest, as for example during the course of a power dive, it is most important accurately to measure the magnitude of forces developed, and accurately to measure other variables to be studied in connection with the operation of the airplane. It is also important to eliminate the effects of vibration.

In carrying out the present invention in one form thereof, there is provided a means for eliminating the effects upon the measuring instrument of any and all accelerating forces as well as vibration. More particularly, there are provided bonded wire type strain gages mounted on one or more elastic members in manner such that strain due to acceleration or vibration changes the electrical resistance of certain of the gages in one direction, while at the same time changing the electrical resistance of other of the gages in the opposite direction. Accordingly, the gages are connected in a measuring network so that the effects due to acceleration or vibration balance out, though strain produced by the variable under measurement produces maximum response of the measuring device.

Figure 1:
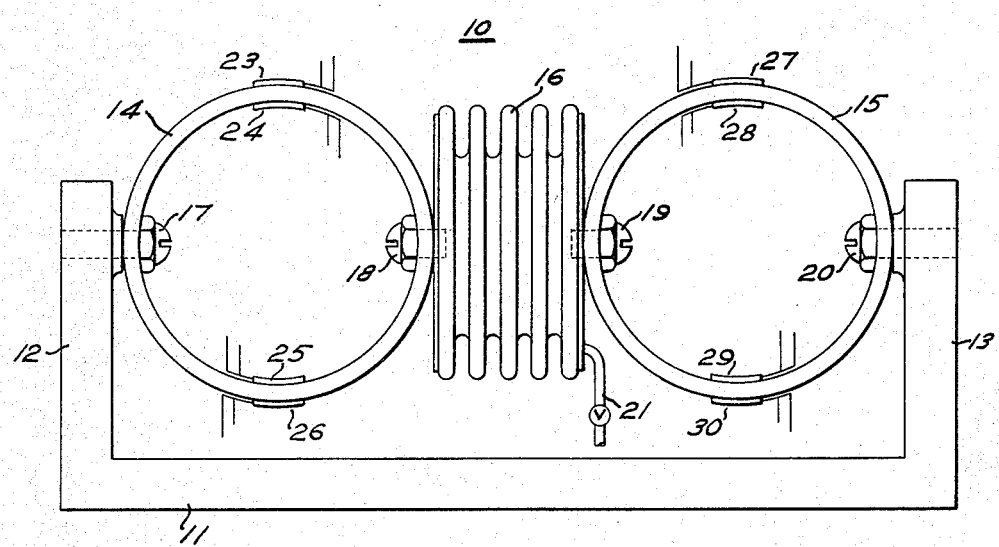
Figure 2:
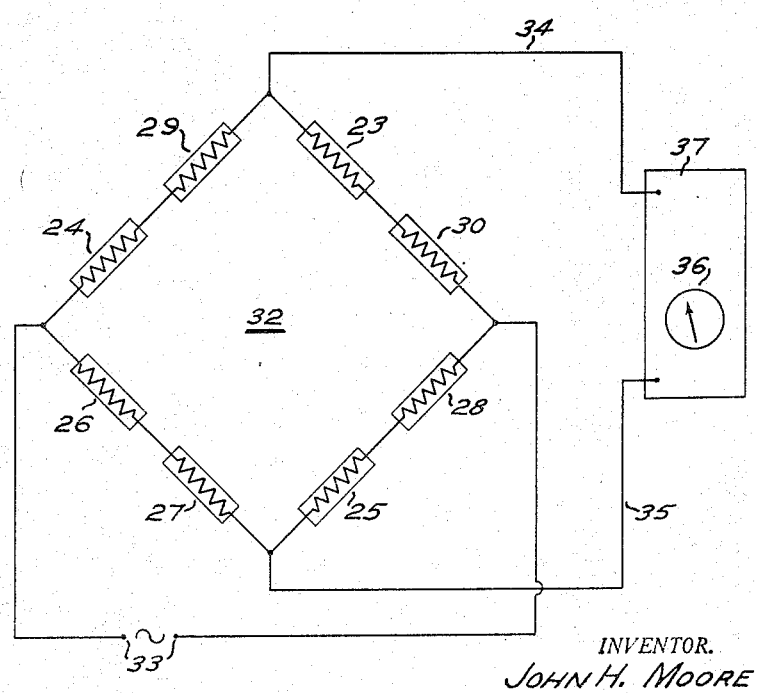
Figure 3:
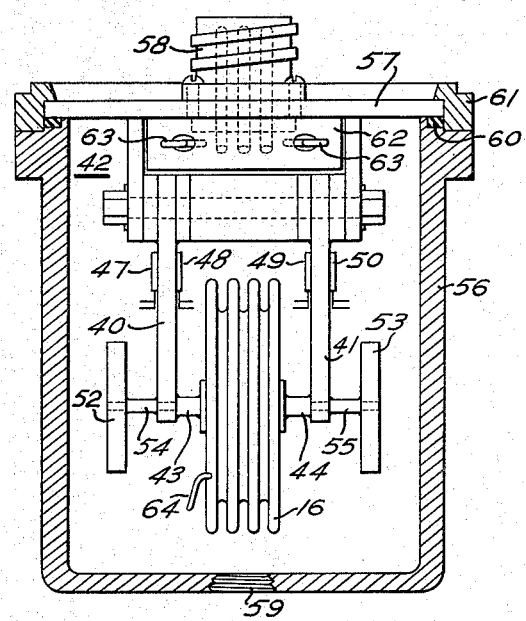

For a more complete understanding of the invention, and for further objects and advantages thereof, reference should be had to the following description, taken in conjunction with the accompanying drawings, in which:

Fig. 1 is an elevation of measuring apparatus embodying the invention;

Fig. 2 diagrammatically illustrates a measuring circuit for the strain gages utilized in Fig. 1;

Fig. 3 is an elevation of a measuring apparatus embodying a modification of the invention.

Figure 4:
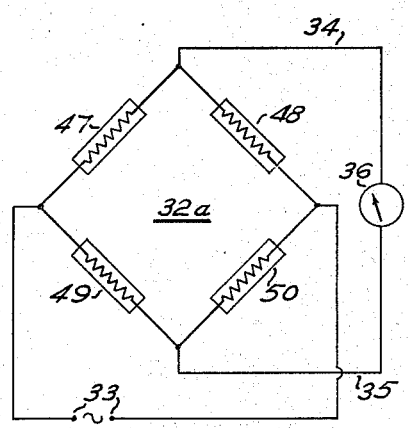
Figure 5:
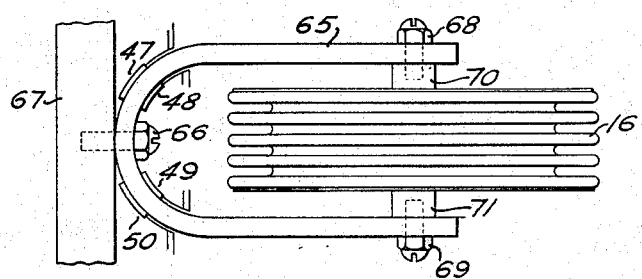

Fig. 4 diagrammatically illustrates a measuring circuit for the modification of Fig. 3; and Fig. 5 is an elevation of a further modified form of the invention.

Referring to the drawings, the invention in one form has been shown as applied to the measuring apparatus 10 of Fig. 1. A yoke 11 has arms 12 and 13 for the support therebetween of elastic members in the form of rings 14 and 15, and operating means shown as a flexible bellows 16. It will be seen that the mounting screws 17, 18, 19, and 20 hold the rings 14 and 15 in symmetrical relation with a common diametral line, which line coincides with a horizontal central line through the bellows 16, as viewed in Fig. 1. The bellows 16 may be filled with any suitable fluid, depending upon the particular application for which the measuring apparatus 10 is designed. For example, it may be filled with a volatile liquid such as alcohol, and may be connected by tubing to a bulb located on a bearing or at such other location as to be responsive to a temperature to be measured. The bellows 16 may be evacuated and sealed for use as an altimeter or it may be fluid-connected, as by the tube 21 to a Pitot tube for measurement of air speed of aircraft.

Upon expansion of the bellows 16, the rings 14 and 15 will be subjected to forces which will flatten them somewhat; that is, they will elongate in vertical directions as viewed in Fig. 1. Accordingly, bonded wire type strain gages, such as disclosed in Simmons Patent 2,292,549, are effectively employed to measure the strain produced in each of rings 14 and 15. More specifically, strain gages 23—26 are bonded to the ring 14 at regions diametrically normal to the line of the support including screws 17 and 18. Similarly strain gages 27—30 are bonded to the ring 15 in regions diametrically normal to the line of support including the screws 19 and 20. Upon contraction of the bellows 16 the rings 14 and 15 will contract or elongate in the direction of their axis of support. The resistance of each strain gage will vary in accordance with the extent and direction of the strain applied to it.

In order to eliminate errors in the instrument due to forces created by the weight of the bellows and the rings during acceleration, or by vibration, the gages are so connected in a measuring circuit that the effects of accelerating forces and vibrations are eliminated. As shown in Fig. 2, the gages 24 and 29 comprise one arm of a Wheatstone bridge 32, the gages 26 and 27 comprise a second arm, the gages 23 and 30 comprise a third arm, and the gages 25 and 28 comprise the fourth arm thereof. Either alternating current or direct current may be supplied to the bridge as from supply terminals 33, while conductors 34 and 35 apply the output from the bridge to an indicating system including a sensitive meter 36. In some cases, the conductors 34 and 35 may be connected directly to the meter 36, while in other cases, as indicated by the rectangle 37, an amplifier may be interposed between the output conductors and the meter. The meter 36 will be calibrated in terms of the quantity under measurement, for example pressure, air speed, altitude, or temperature. A comparison of Figs. 1 and 2 will show the location of the gages on the rings 14 and 15 and their location in the respective arms of the bridge 32.

If the measuring apparatus 10 be located on moving craft such as airplanes, vehicles and the like, the inertia of the rings 14 and 15 and of the bellows 16, will give rise to accelerating forces which will tend to cause vertical elongation of each of the rings 14 and 15. It will be assumed that the measuring apparatus 10 is moving to the right at an accelerated rate, as viewed in Fig. 1. Accordingly, the ring 14 will be compressed, the force being applied in the region of the screw 18. The gages 23 and 26 will be subjected to tensional strain, and therefore the resistances thereof will increase. At the same time, the gages 24 and 25 will be subjected to compressional strain, and since the resistance wire of each gage is under a predetermined initial tension, that is, prestressed, the resistances thereof will decrease. At the same time, the accelerating force will be applied to the ring 15 in the region of the screw 19 in a direction to cause the ring to decrease its vertical diameter as viewed in Fig. 1. Accordingly, the gages 28 and 29 will be subjected to tensional strain to increase their resistances, while the gages 27 and 30 will be subjected to compressional strains to reduce their resistances. The result is that in each arm of the bridge 32 the resistance of one gage is increased while that of the other gage is decreased. The resistance change of one gage, as for example the gage 28, is compensated for by the resistance change in the opposite direction of another gage, as for example the gage 25. Accordingly, no output is produced across the conductors 34 and 35 due to the distortion of the rings 14 and 15 by the accelerating forces, regardless of their direction.

The action of the bellows 16, whether expanding or contracting, causes the resistances in each arm of the bridge to vary in the same direction for maximum change in the output across the conductors 34 and 35. Assuming an expansion of the bellows 16, both rings 14 and 15 will be compressed and both will tend to elongate along diametral lines passing through the regions in which the gages are located. The gages 24 and 28 will both be subjected to compressional strains to reduce their resistances, while the gages 23 and 27 will be subjected to tensional strains which will increase their resistances. Similarly the resistances of gages 25 and 29 will decrease, while those of gages 26 and 30 will increase. If the bellows 16 contracts, the strain gages simultaneously operate to change the output across the conductors 34 and 35. At all times the device eliminates the effect of vibration and acceleration and responds with maximum sensitivity to changes in the volume of the bellows 16.

The adverse effects of horizontal acceleration or of horizontal vibration may be compensated for by connecting the gages in the bridge 32 in the following manner, beginning with the arm including the gage 24: in the first arm the gages 24 and 28; in the second arm, in a clockwise direction, the gages 23 and 27; in the third arm the gages 25 and 29; and in the fourth arm there will be connected the gages 26 and 30.

In order also to compensate for vertical vibrations and vertical components of acceleration, the criss-cross disposition of the gages as shown in Fig. 2 is utilized. More specifically, the gages 24, 26, 28 and 30 will be subjected to tensional strain, while the remaining gages will be subjected to compressional strain. In each arm of the bridge 32 the resistance of one gage, as the gages 24, 26, 28 and 30, will be increased, while in each arm the resistance of another gage, as the gages 23, 25, 27 and 29, will be decreased. There will be no resultant unbalance of the bridge 32. Thus, the system of Figs. 1 and 2 compensates for vibrations and accelerating forces in all directions and yet produces an output undiminished by the compensating features just described.

Now that the principles of the invention have been explained, it will be understood that various modifications may be made within the scope of the appended claims. For example, Fig. 3, elastic members in the form of cantilever arms 40 and 41 extend downwardly from a rigid support 42. The bellows 16 is supported between the free ends of the arms 40 and 41 by means of spacers 43 and 44 silver-soldered or otherwise secured thereto. Strain gages 47 and 48 are secured to the arm 40 in the region adjacent the support 42, while strain gages 49 and 50 are bonded to the arm 41 adjacent the support 42. In this case, the measuring circuit is preferably of the form shown in Fig. 4, where a Wheatstone bridge 32a is illustrated with the strain gages 47—50 each forming an arm of the bridge. As in Fig. 2, direct or alternating current is supplied from the terminals 33 and a measuring instrument 36 responds to unbalance of the bridge 32a. Upon expansion of the bellows 16 the gages 48 and 49 will be subject to tensional strain for increase in their resistances, while the gages 47 and 50 will be subject to compressional strain for decrease in their resistances. For a given change in the volume of the bellows 16 a maximum output will be applied to the measuring instrument 36. For a contraction of the bellows 16, the gages 48 and 49 will decrease in resistance, while the gages 47 and 50 will increase their resistance again to produce maximum change in the output applied to the measuring instrument 36.

Further in accordance with the invention, effects due to accelerating forces and vibration will be neutralized inasmuch as such forces will tend to deflect the arms 40 and 41 either to the right or to the left as viewed in Fig. 3. Assuming that the accelerating forces tend to move the arms to the right, it will be observed the gages 47 and 49 will be subjected to tensional strain to increase their resistances while the gages 48 and 50 will be subject to compressional strain to decrease their resistances. Thus the ratio of the resistances in the adjacent arms of the bridge remain constant. In consequence there will not arise a resultant output from the bridge 32a due to such accelerating forces or due to vibration. The compensation will be effective for directions of accelerating forces and vibrations.

Due to the spacing of the bellows 16 inwardly of the ends of the arms 40 and 41 bending moments are applied thereto. These are neutralized by means of counterweights 52 and 53 supported on spacers 54 and 55. The moment applied to the arm 40 by the weight 52 and the spacer 54 is equal and opposite to the moment applied by the weight of the bellows acting through the spacer 43. The same relation applies to the weight 53 and its spacer 55 with respect to spacer 44 and the weight of the bellows 16. The added provisions adapt the instrument for use under conditions which heretofore presented most difficult problems of measurement.

In each form of the invention, the measuring apparatus or instrument may be readily enclosed. For example, in Fig. 3 it will be seen that the measuring device is enclosed by a housing 56 which is secured to a base plate 57 from which the support 42 is suspended. The base plate 57 is provided with an opening and a connector 58 disposed therein for passage of the connecting wires. If the device is utilized as an altimeter the housing 56 may be provided with an opening 59 to expose the bellows 16 to the atmosphere, it being understood that the bellows will then be sealed under sub-atmospheric conditions. By inserting a plug within the opening 59, the device as a whole may be hermetically sealed, a suitable gasket 60 and a securing flange 61 being provided for this purpose. A connecting cup 62 is also provided with insulators 63 forming air tight connections for passage of the lead wires from the gages to the connector 58.

If the interior of the bellows is connected through a tube 64 to a Pitot tube exposed to the air stream, the instrument may be utilized as an air-speed indicator.

The same principles may be applied to an elastic member in the form of a U-shaped bar 65, Fig. 5, secured as by a screw 66 to a stationary support 67. The bellows 16 is secured to the free ends of the bar 65 by means of screws 68 and 69, and spacers 70 and 71. In the region of maximum strain, gages 47—50 are bonded to the bar 65. These gages have been given the same reference characters as those of the modification of Fig. 3, and the same measuring circuit, Fig. 4, may be utilized for them. The operation will be the same as the modification of Fig. 3. In other words, as the bellows 16 expands, it will subject the gages 47 and 50 to compressional strains, while the gages 48 and 49 will be subjected to tensional strain to produce maximum output from the bridge 32a. However, accelerating forces which tend to move the free ends of the U-shaped bar 65 in the same direction, either upwardly or downwardly, as viewed in Fig. 5, will be neutralized because the resistance change of gages 47 and 49 will be in one direction, while the resistance change of gages 48 and 50 will be in the opposite direction.

In each form of the invention the material of which the elastic member is formed will be selected for the particular application. For many applications carbon steel will be satisfactory, although an alloy known as "SAE 4340" is also quite satisfactory. Such an alloy, of chromium, molybdenum, nickel and iron is utilized for aircraft tubing and has been found highly satisfactory for the ring-shaped elastic members. These rings 14 and 15 may be from one to three inches in diameter, from one thirty-second to one-quarter inch in thickness, and from three-eighths to one inch in width, though these dimensions are to be taken as suggestive and not as limitative upon the invention.

While the rings 14 and 15, Fig. 1, have been shown as supported in coplanar relationship by the yoke 11, it is to be understood that separate supporting means may be utilized for each ring, and that any suitable force-applying means may be used in place of the expansible bellows 16. Similar modifications in the supporting means for the elastic cantilever arms 40 and 41 may be made without departing from the invention.

What is claimed is:

1. A measuring apparatus comprising a pair of elastic rings, means supporting said rings in coplanar relation, expansible means disposed between said rings for simultaneously applying pressure thereto, strain gages secured to the inner and outer surfaces of each of said rings, the gages on said inner and outer surfaces being simultaneously subjected to tensional and compressional strain upon expansion or contraction of said expansible means, a measuring circuit including at least two arms, with gages on corresponding surfaces of said rings included in each of said arms for producing an output upon operation of said expansible means, and for preventing an output due to the effects of vibration or accelerating forces.

2. A measuring apparatus comprising a pair of elastic rings, means engaging the peripheries of said rings for supporting them in coplanar relationship, expansible means disposed between said rings and connected thereto for simultaneous application of pressure diametrically thereof, bonded wire type strain gages secured to each of said rings on the inner and outer surfaces thereof in the regions where maximum strain occurs, a Wheatstone bridge including said strain gages, said bridge including in one arm an inner gage of one ring and a diagonally opposite inner gage of the other ring, another arm of said bridge including the other inner gage of said one ring and the other diagonally opposite inner gage of said other ring, and the remaining arms of said bridge each including the diagonally opposite outer gages of said rings, for compensation of all movements of said rings other than those produced by expansion and contraction of said expansible means.

3. Condition responsive apparatus comprising a pair of centilever arms, condition responsive expansible means disposed between the free ends of said arms for effecting flexure thereof in one direction or the other, and for producing tensional and compressional strains therein, wire type strain gages bonded to each of said arms in the regions where substantially equal strain occurs, and counterweights secured to said arms to compensate for the effect upon said arms of the weight of said expansible means.

4. Condition responsive apparatus comprising a pair of centilever arms, condition responsive expansible means disposed between the free ends of said arms for moving said arms relative to each other and producing therein tensional and compressional strains, a pair of wire type strain gages for each arm, one of each pair being bonded to opposite sides of each of said arms in the regions where substantially equal tensional and compressional stresses occur, a Wheatstone bridge including said strain gages in the respective arms thereof, said gages subject to like kinds of strain in said arms being connected in opposite arms of the bridge for producing maximum unbalance thereof upon expansion or contraction of said expansible means, and for maintaining balance of said bridge due to strains arising from vibration or application to said arms of accelerating forces.

5. Condition responsive apparatus comprising two elastic members, means rigidly supporting them with corresponding portions disposed adjacent each other, means for simultaneously applying a force to said members to move them relative to each other and thereby to produce tensional and compressional strains therein, a pair of wire type strain gages for each member, one of each pair being bonded to opposite sides of each of said members in the regions where substantially equal tension and compression stresses occur, and a Wheatstone bridge including said strain gages in the respective arms thereof and so arranged therein that upon operation of said force-applying means the bridge is unbalanced and upon any other movement of said elastic members by other than said force-applying means said bridge remains in balance.

6. Condition responsive apparatus comprising, in combination, a pair of elastically movable members, means for commonly supporting the same so that when elastically moved together in a common direction they are deformed to produce strains of opposite sign or upon elastic movement relative to each other they are deformed to produce strains of like sign, condition responsive means connected to said members to effect said elastic movement thereof in said common direction or to effect said elastic movement of the members relative to each other in response to a variation of said condition, a pair of electrical strain sensitive elements connected to one of said members so that one of such elements is subject to said strain in one sense and the other element is subject to said strain in the opposite sense upon elastic movement of that member, another pair of electrical strain sensitive elements similarly connected to and responsive to elastic movement of the other of said members, and an electrical bridge circuit having two of its opposite arms contain the sensitive elements of the respective members whose strain sense is the same when said members elastically move relative to each other and the other two opposite arms contain the sensitive elements of the respective members whose strain sense is of the opposite sign when said members elastically move together in a common direction whereby the circuit has an electrical output when said members elastically move relative to each other and has no output when said members elastically move together in said common direction.

7. Condition responsive apparatus comprising, in combination, a pair of movable elastic members, means for commonly supporting the same so that when elastically moved together in a common direction they are deformed to produce strains therein of opposite sense or when elastically moved relative to each other they are deformed to produce strains therein of the same sense, condition responsive means connected to said members to effect said elastic movement in said common direction or to elastically move said members relative to each other in response to a variation of the condition, a plurality of electrical impedance means, one for each of said members and being connected thereto so that each of the impedance means is responsive to strains of like sense upon elastic movement of the members together in a common direction and is responsive to strains of opposite sense upon relative elastic movement between said members, and an electrical bridge circuit including in two of its adjacent arms the impedance means of the respective members whereby the circuit has an electrical output when said members move elastically relative to each other and has no output when said members elastically move together in said common direction.

8. Condition responsive apparatus comprising, in combination, a pair of movable elastic members, means for commonly supporting the same so that when elastically moved together in a common direction they are deformed to produce strains therein of opposite sense or when moved relative to each other they are deformed to produce strains therein of the same sense, condition responsive means connected to said members to effect said elastic movement in said common direction or to elastically move said members relative to each other in response to a variation of the condition, an electrical strain sensitive element connected to one of said members so as to be subject to said strain in one sense upon occurrence of elastic movement of that member relative to the other member, another electrical strain sensitive element connected to the other of said members so as to be subject to said strain in the opposite sense when said members elastically move together in the same direction, and an electrical bridge circuit having two of its opposite arms containing the sensitive elements of said members whereby the circuit has an electrical output when said members elastically move relative to each other and has no output when said members elastically move together in said common direction.

9. Fluid pressure responsive apparatus comprising, in combination, a cantilever bending beam, fluid pressure responsive means having two relatively movable portions, means for commonly supporting said beam and one of said portions, means for connecting the other of said portions to the free end of said beam to bend the same in response to a change of pressure, said connecting means also transmitting a bending force to the beam when the mass of the responsive means is subjected to acceleration in a predetermined direction, a mass connected to the beam and spaced apart from the beam and from the free end thereof in a direction away from the point at which said connecting means is attached to the beam so as to produce on the beam a bending force opposed to the bending force produced on the beam by the responsive means when the responsive means and mass are subjected to the same acceleration in the same direction, and electrical impedance strain gage means connected to said beam to determine strains therein as a measure of the pressure for producing such strains.

10. Fluid pressure responsive apparatus comprising, in combination, a cantilever beam, fluid pressure responsive means having two relatively movable portions, means for supporting one end of said beam and one of said portions so that the responsive means is disposed to one side of the beam so that said relative movement occurs in a direction substantially normal to the lengthwise axis of the beam, means for connecting the other of said portions to the free end of said beam to bend the same in response to a change of pressure, said connecting means also transmitting a bending force to the beam when the mass of the responsive means is subjected to acceleration in the direction of the lengthwise axis of the beam, a mass connected to the beam on the side thereof opposite to that on which the responsive means is disposed thereby to produce on the beam an opposing bending force when subjected to the same acceleration in the same direction, and electrical impedance strain gage means connected to said beam to determine strains therein as a measure of the pressure for producing such strains.

JOHN H. MOORE.

REFERENCES CITED

The following references are of record in the file of this patent:

UNITED STATES PATENTS

| Number | Name | Date |
| --- | --- | --- |
| 2,036,458 | Carlson | Apr. 7, 1936 |
| 2,059,549 | Carlson | Nov. 3, 1936 |
| 2,322,319 | Ruge | June 22, 1943 |
| 2,392,293 | Ruge | Jan. 1, 1946 |
| 2,419,061 | Emery | Apr. 15, 1947 |